(12) United States Patent
Davis

(10) Patent No.: US 11,009,309 B1
(45) Date of Patent: May 18, 2021

(54) GAME CALL ARCHERY RELEASE ASSEMBLY

(71) Applicant: Gary Davis, Philadelphia, NY (US)

(72) Inventor: Gary Davis, Philadelphia, NY (US)

(*) Notice: Subject to any disclaimer, the term of this patent is extended or adjusted under 35 U.S.C. 154(b) by 0 days.

(21) Appl. No.: 16/688,663

(22) Filed: Nov. 19, 2019

(51) Int. Cl.
F41B 5/18 (2006.01)
A01M 31/00 (2006.01)
F41B 5/14 (2006.01)
G10K 15/04 (2006.01)

(52) U.S. Cl.
CPC ......... *F41B 5/1469* (2013.01); *A01M 31/004* (2013.01); *G10K 15/04* (2013.01)

(58) Field of Classification Search
CPC ....... F41B 5/14; F41B 5/1469; A01M 31/004; G10K 15/04
USPC ............................ 124/35.2, 86; 446/397, 404
See application file for complete search history.

(56) References Cited

U.S. PATENT DOCUMENTS

| | | | | |
|---|---|---|---|---|
| 5,352,146 A * | 10/1994 | Shuart | ................. | A01M 31/004 124/35.1 |
| 5,419,304 A * | 5/1995 | Pardue | ................. | A01M 31/004 124/86 |
| 5,431,590 A * | 7/1995 | Abbas | ................. | A01M 31/004 124/90 |
| 5,964,054 A * | 10/1999 | Galfidi, Jr. | ............... | G10K 9/04 42/90 |
| 6,155,244 A * | 12/2000 | McClanahan | ............. | F41B 5/14 124/86 |
| 7,234,987 B1 * | 6/2007 | Brazil | ................. | A01M 31/004 224/219 |
| 8,186,339 B1 * | 5/2012 | McClanahan | ......... | F41B 5/1434 124/86 |
| 2007/0089722 A1 * | 4/2007 | Flanagan | ................. | F41B 5/14 124/23.1 |
| 2012/0040648 A1 * | 2/2012 | Sceery | ................ | A01M 31/004 455/414.1 |
| 2016/0324140 A1 * | 11/2016 | Gregorich | ................. | A45F 5/00 |

* cited by examiner

Primary Examiner — Alexander R Niconovich

(57) ABSTRACT

A game call archery release assembly for actuating an animal call while drawing an archery bow includes an archery release that is weareable on a wrist of a user. The archery release engages a string on an archery bow for drawing and subsequently releasing the string. The archery release includes a wrist strap and a trigger portion. An electronic game call is integrated into the archery release. The electronic game call emits an audible sound when the electronic game call is actuated to attract a game animal. Moreover, the electronic game call is actuatable while the string on the archery bow is drawn facilitate hands free use.

5 Claims, 5 Drawing Sheets

GAME CALL ARCHERY RELEASE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to game call devices and more particularly pertains to a new game call device for actuating an animal call while drawing an archery bow.

(2) Description of Related Art Including Information Disclosed Under 37 CFR 1.97 and 1.98

The prior art relates to game call devices. The prior art discloses a variety of game calls that are mountable to an archery bow. The game calls as disclosed do not have any means of being actuated when the archery bow is being drawn. The prior art discloses a device for altering the sound of an archery bow being fired thereby inhibiting a game animal from startled by the archery bow. None of the prior art related to the patent search discloses a game call that is integrated into an archery release.

BRIEF SUMMARY OF THE INVENTION

An embodiment of the disclosure meets the needs presented above by generally comprising an archery release that is weareable on a wrist of a user. The archery release engages a string on an archery bow for drawing and subsequently releasing the string. The archery release includes a wrist strap and a trigger portion. An electronic game call is integrated into the archery release. The electronic game call emits an audible sound when the electronic game call is actuated to attract a game animal. Moreover, the electronic game call is actuatable while the string on the archery bow is drawn facilitate hands free use.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
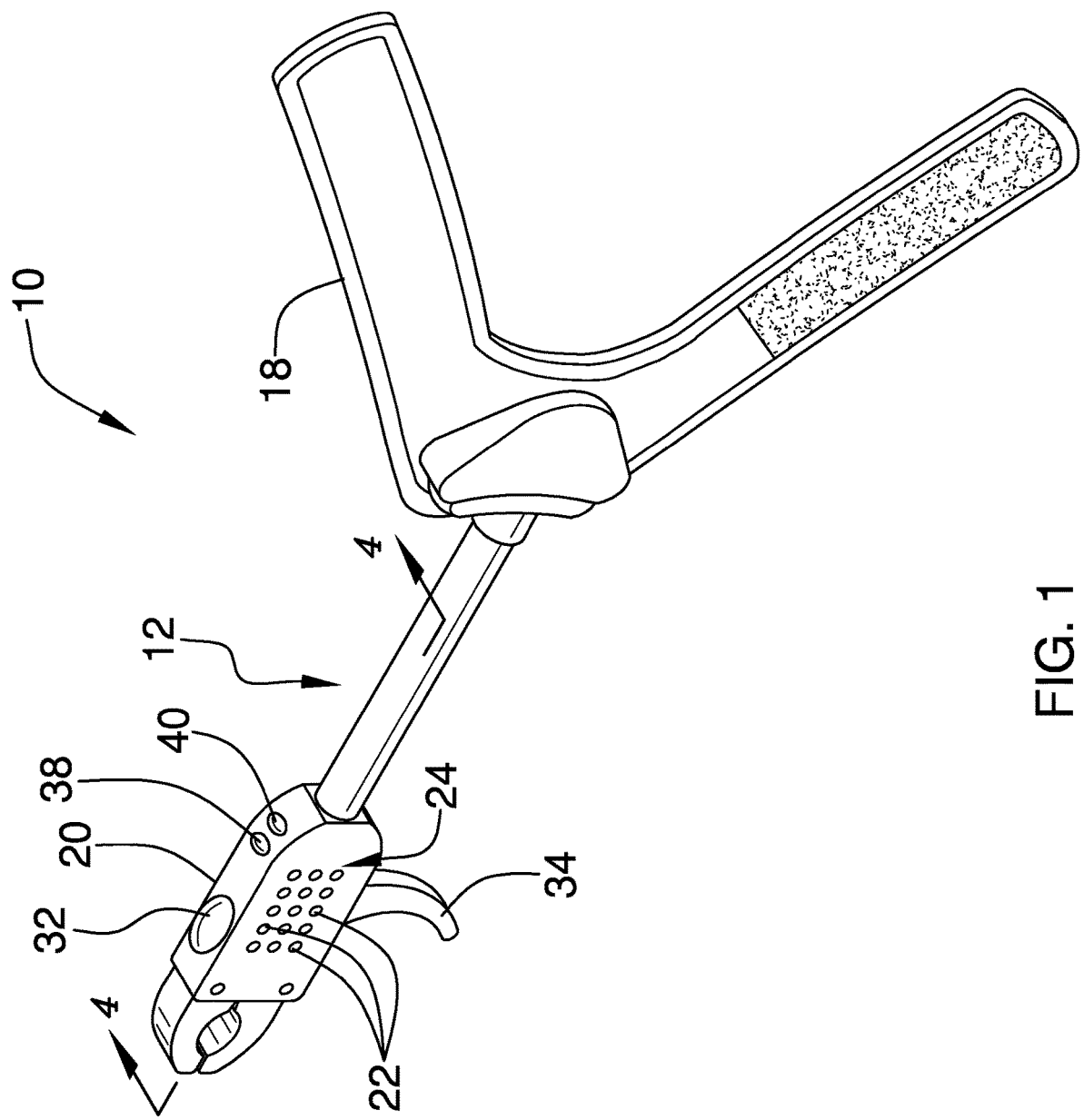
FIG. 1 is a perspective view of a game call archery release assembly according to an embodiment of the disclosure.
Figure 2:
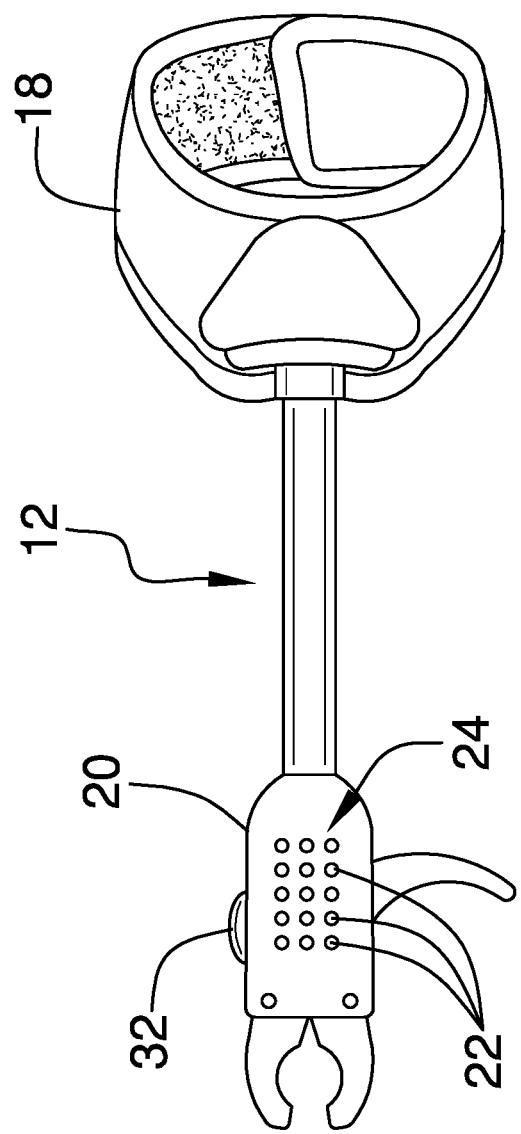
FIG. 2 is a top view of an embodiment of the disclosure.
Figure 3:
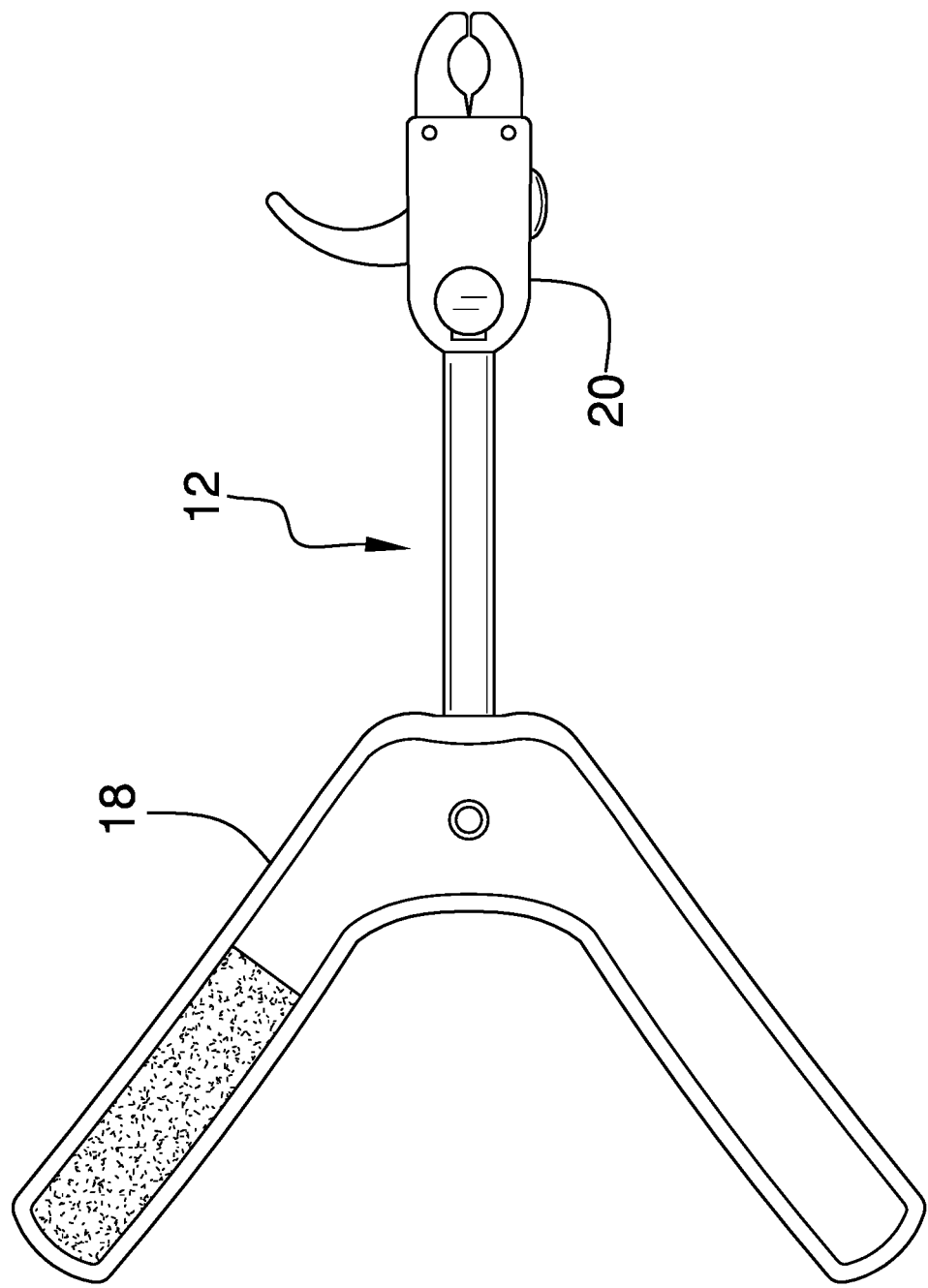
FIG. 3 is a bottom view of an embodiment of the disclosure.
Figure 4:
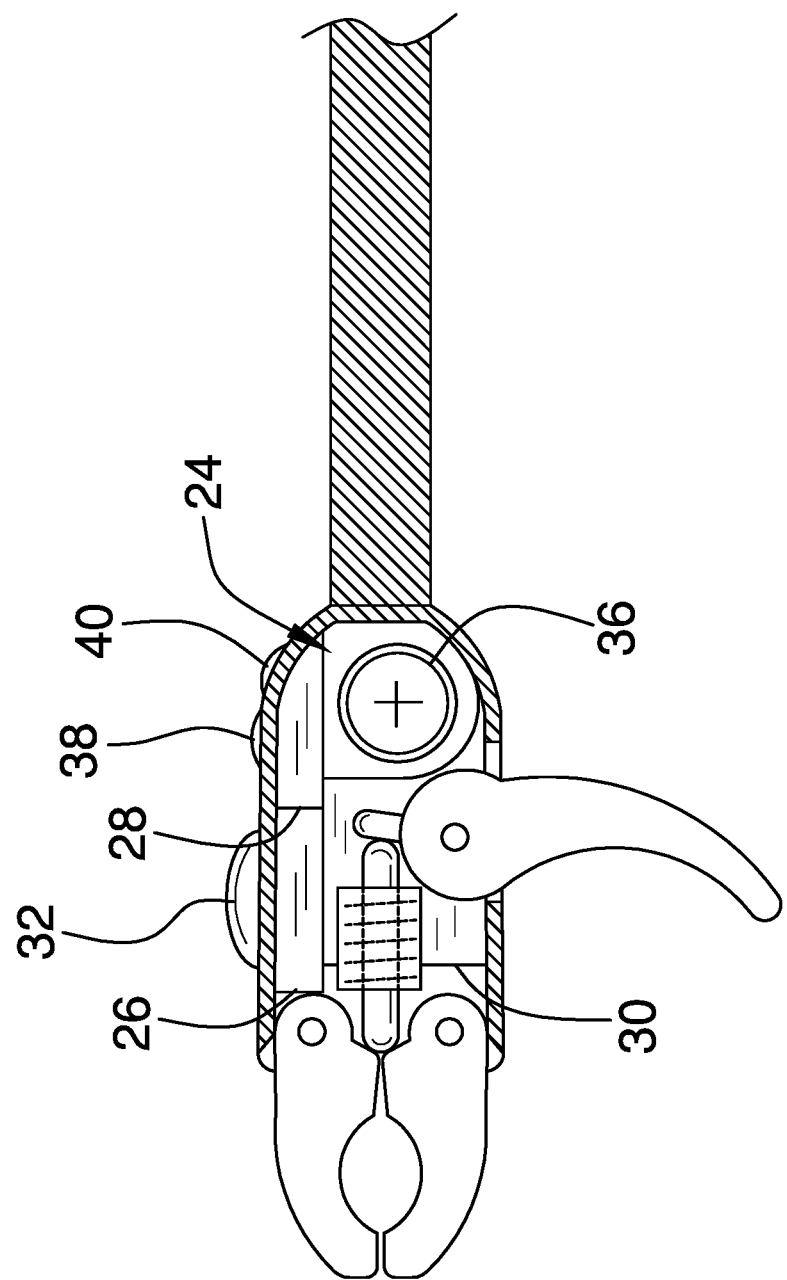
FIG. 4 is a cross sectional view of an embodiment of the disclosure.
Figure 5:
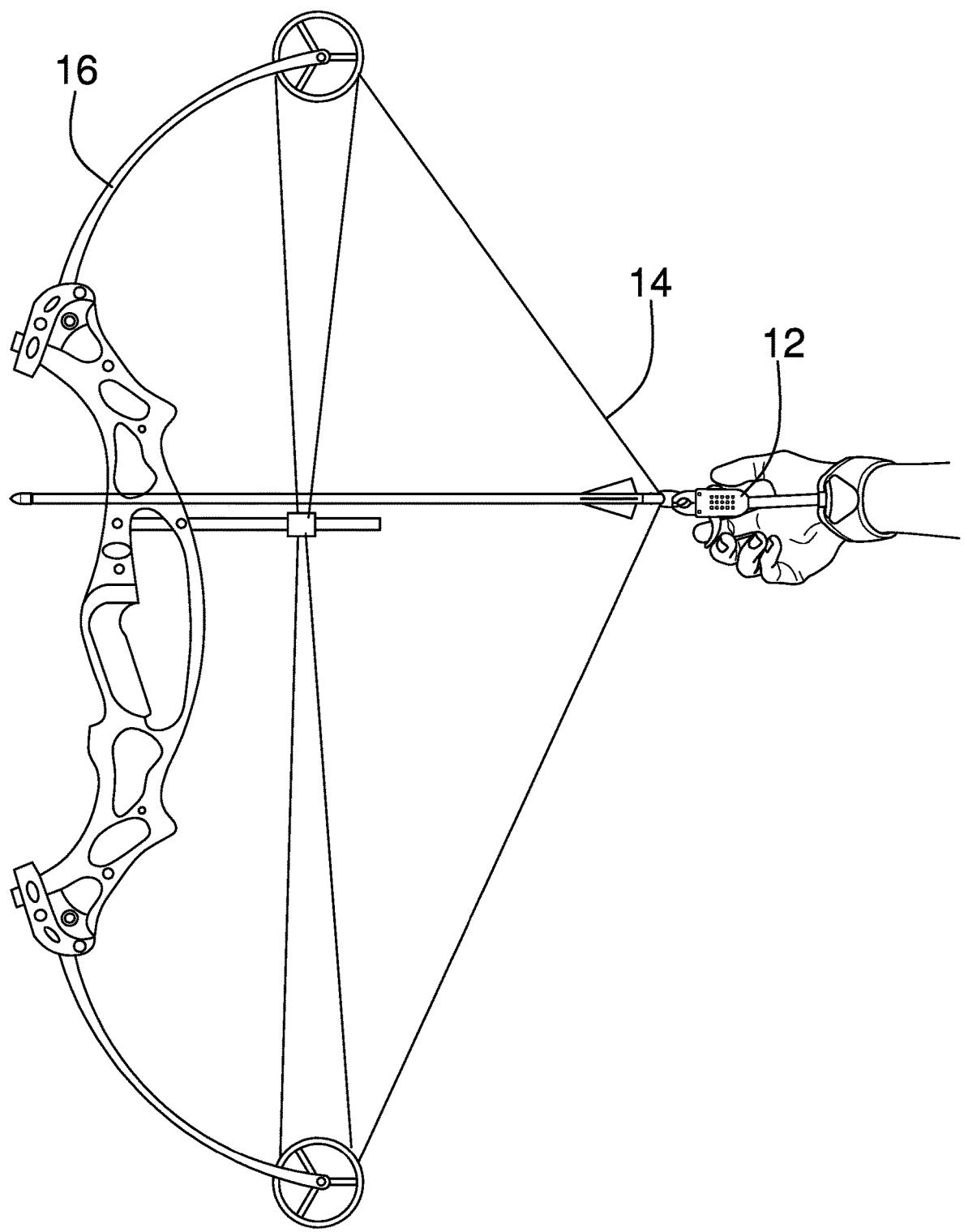
FIG. 5 is a perspective in-use view of an embodiment of the disclosure.

With reference now to the drawings, and in particular to FIGS. 1 through 5 thereof, a new game call device embodying the principles and concepts of an embodiment of the disclosure and generally designated by the reference numeral 10 will be described.

As best illustrated in FIGS. 1 through 5, the game call archery release assembly 10 generally comprises an archery release 12 that is weareable on a wrist of a user. The archery release 12 engages a string 14 on an archery bow 16 for drawing and subsequently releasing the string 14. The archery release 12 includes a wrist strap 18 and a trigger portion 20. The trigger portion 20 is hollow and the trigger portion 20 has a plurality of sound holes 22 each extending into an interior of the trigger portion 20.

An electronic game call 24 is provided and the electronic game call 24 is integrated into the archery release 12. The electronic game call 24 emits an audible sound when the electronic game call 24 is actuated. In this way the electronic game call 24 attracts a game animal. The electronic game call 24 is actuatable while the string 14 on the archery bow 16 is drawn. Thus, the electronic game call 24 facilitates hands free use while the user is drawing the archery bow 16.

The electronic game call 24 comprises a control circuit 26 that is integrated into the trigger portion 20 and the control circuit 26 receives an on input. An electronic memory 28 is integrated into the trigger portion 20 and the electronic memory 28 is electrically coupled to the control circuit 26. The electronic memory 28 stores audio data comprising the sound of an animal. The sound of the animal may be the sound of a doe deer in heat, a grunt of a buck deer in the rut or the sound of any other animal that might be hunted with an archery bow 16.

A speaker 30 is positioned in the trigger portion 20 of the archery release 12 and the speaker 30 is aligned with the sound holes 22. The speaker 30 is electrically coupled to the control circuit 26 for receiving the audio data from the electronic memory 28. The speaker 30 is turned on when the control circuit 26 receives the on input. Moreover, the speaker 30 emits the sound of the animal outwardly through the sound holes 22 when the speaker 30 is turned on.

A sound button 32 is movably coupled to the trigger portion 20 of the archery release 12 and the sound button 32 is electrically coupled to the control circuit 26. The control circuit 26 receives the on input when the sound button 32 is depressed. The trigger portion 20 includes a trigger 34 that is manipulated to release the string 14 of the archery bow 16. The sound button 32 may be positioned on an opposite side of the trigger portion 20 from the trigger. In this way the sound button 32 can be depressed with the user's thumb while the user's index finger is positioned to manipulate the trigger 34. A power supply 36 is positioned in the trigger portion 20, the power supply 36 is electrically coupled to the control circuit 26 and the power supply 36 comprises at least one battery.

A volume up button 38 is positioned on the trigger portion 20 and the volume up 38 button is electrically coupled to the control circuit 26. The volume up 38 button increases the volume of the speaker 30 toward a maximum volume. A volume down button 40 is positioned on the trigger portion 20 and the volume down button 40 is electrically coupled to the control circuit 26. The volume down button 40 decreases the volume of the speaker 30 toward a minimum volume.

In use, the archery release 12 is employed in the conventional fashion of employing archery releases. The sound button 32 can be depressed while the user is drawing the archery bow 16. Thus, the speaker 30 emits the sound of the animal to while the archery bow 16 is being drawn. In this way the user can emit a game call 24 while the user is drawing the archery bow 16. Thus, game that the user is hunting can be attracted to the user or the game can be urged to remain motionless while the user is holding the archery bow 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A game call archery release assembly being configured to integrate an artificial animal call with an archery release, said assembly comprising:
   an archery release being wearable on a wrist of a user, said archery release engaging a string on an archery bow for drawing and subsequently releasing the string, said archery release including a wrist strap and a trigger portion, said trigger portion including a trigger configured to be manipulated to release the string, said trigger portion being hollow, said trigger portion having a plurality of sound holes each extending into an interior of said trigger portion;
   an electronic game call being integrated into said archery release, said electronic game call emitting an audible sound when said electronic game call is actuated wherein said electronic game call is configured to attract a game animal, said electronic game call being actuatable while the string on the archery bow is drawn, said electronic game call including a control circuit being integrated into said trigger portion, said control circuit receiving an on input for actuating production of said audible sound; and
   a sound button being movably coupled to said trigger portion of said archery release, said sound button being electrically coupled to said control circuit, said control circuit receiving said on input when said sound button is depressed, said sound button being positioned on an opposite side of said trigger portion from said trigger, said sound button being positioned such that said trigger portion is configured to position a thumb directly above an index finger engaging said trigger of said trigger portion wherein said sound button is configured for being manipulated by the thumb while said trigger is configured to be manipulated by the index finger.

2. The assembly according to claim 1, further comprising an electronic memory being integrated into said trigger portion, said electronic memory being electrically coupled to said control circuit, said electronic memory storing audio data comprising a sound of an animal.

3. The assembly according to claim 2, further comprising a speaker being positioned in said trigger portion, said speaker being aligned with said sound holes, said speaker being electrically coupled to said control circuit for receiving said audio data from said electronic memory, said speaker being turned on when said control circuit receives said on input, said speaker emitting the sound of the animal outwardly through said sound holes when said speaker is turned on.

4. The assembly according to claim 1, further comprising a power supply being positioned in said trigger portion, said power supply being electrically coupled to said control circuit, said power supply comprising at least one battery.

5. A game call archery release assembly being configured to integrate an artificial animal call with an archery release, said assembly comprising:
   an archery release being wearable on a wrist of a user, said archery release engaging a string on an archery bow for drawing and subsequently releasing the string, said archery release including a wrist strap and a trigger portion, said trigger portion being hollow, said trigger portion having a plurality of sound holes each extending into an interior of said trigger portion, said trigger portion including a trigger configured to be manipulated to release the string; and
   an electronic game call being integrated into said archery release, said electronic game call emitting an audible sound when said electronic game call is actuated wherein said electronic game call is configured to attract a game animal, said electronic game call being actuatable while the string on the archery bow is drawn, said electronic game call comprising:

a control circuit being integrated into said trigger portion, said control circuit receiving an on input;

an electronic memory being integrated into said trigger portion, said electronic memory being electrically coupled to said control circuit, said electronic memory storing audio data comprising a sound of an animal;

a speaker being positioned in said trigger portion, said speaker being aligned with said sound holes, said speaker being electrically coupled to said control circuit for receiving said audio data from said electronic memory, said speaker being turned on when said control circuit receives said on input, said speaker emitting the sound of the animal outwardly through said sound holes when said speaker is turned on;

a sound button being movably coupled to said trigger portion of said archery release, said sound button being electrically coupled to said control circuit, said control circuit receiving said on input when said sound button is depressed, said sound button being positioned on an opposite side of said trigger portion from said trigger, said sound button being positioned such that said trigger portion is configured to position a thumb directly above an index finger engaging said trigger of said trigger portion wherein said sound button is configured for being manipulated by the thumb while said trigger is configured to be manipulated by the index finger; and a power supply being positioned in said trigger portion, said power supply being electrically coupled to said control circuit, said power supply comprising at least one battery.

\* \* \* \* \*